United States Patent [19]

Crane

[11] 4,326,189
[45] Apr. 20, 1982

[54] AIRCRAFT CONTROL/GUIDANCE DISPLAY AND MECHANISM FOR ENROUTE AND LANDING UTILITY

[76] Inventor: Carl J. Crane, Box 17745, San Antonio, Tex. 78217

[21] Appl. No.: 32,419

[22] Filed: Apr. 23, 1979

[51] Int. Cl.³ .................... G01C 21/00; G01C 23/00
[52] U.S. Cl. ................ 340/27 NA; 73/178 R; 116/DIG. 43
[58] Field of Search .......... 340/27 AT, 27 R, 27 NA, 340/198, 181, 180; 33/330, 328, 329; 73/178 R, 178 T; 35/12 F, 12 N, 12 L; 116/DIG. 43; 343/107, 108 R; 364/433, 434, 424, 443; 244/181; 358/103; 434/35, 38, 40, 43, 44, 51

[56] References Cited

U.S. PATENT DOCUMENTS

| | | | |
|---|---|---|---|
| D. 179,443 | 12/1956 | Dayton et al. | D10/74 |
| D. 180,812 | 8/1957 | Schweighofer | D10/74 |
| 2,685,226 | 8/1954 | Crane | 340/27 NA |
| 3,162,834 | 12/1964 | Schweighofer et al. | 340/27 AT |
| 3,292,176 | 12/1966 | Crane | 343/108 R |
| 3,307,191 | 2/1967 | Crane | 340/27 NA |
| 3,521,227 | 7/1970 | Congleton et al. | 340/27 NA |
| 3,522,728 | 4/1970 | Brun | 340/27 NA |
| 3,577,120 | 5/1971 | Sherbert | 340/27 NA |
| 3,806,865 | 4/1974 | Stephan et al. | 340/27 NA |
| 4,149,148 | 4/1979 | Miller et al. | 340/27 NA |

*Primary Examiner*—James J. Groody
*Attorney, Agent, or Firm*—Beveridge, DeGrandi, Kline & Lunsford

[57] ABSTRACT

A flight director type of aircraft control or guidance display and mechanism for pilot reference which provides a composite integrated display of roll, pitch and heading with a sensing relationship approximating what the pilot sees through the windshield in the real world environment. The visual cue relationship is retained when the display is viewed during flight in obscure visibility with resulting elimination of vertigo and disorientation. The display is remote from its sensors of aircraft control and guidance and may be positioned in a head erect location in the instrument panel. The electro-mechanical display of roll, pitch and heading embodies a roll symbol which is positioned in front of a rotating dial displaying heading that enables control coordination during turns. An associated horizon bar remains parallel to the display base while rising and falling past the roll symbol to indicate a glide or climb respectively. The integrated indicia of aircraft control are closely associated with guidance indications to facilitate effective and precise control or guidance of the aircraft in the approach/landing.

4 Claims, 4 Drawing Figures

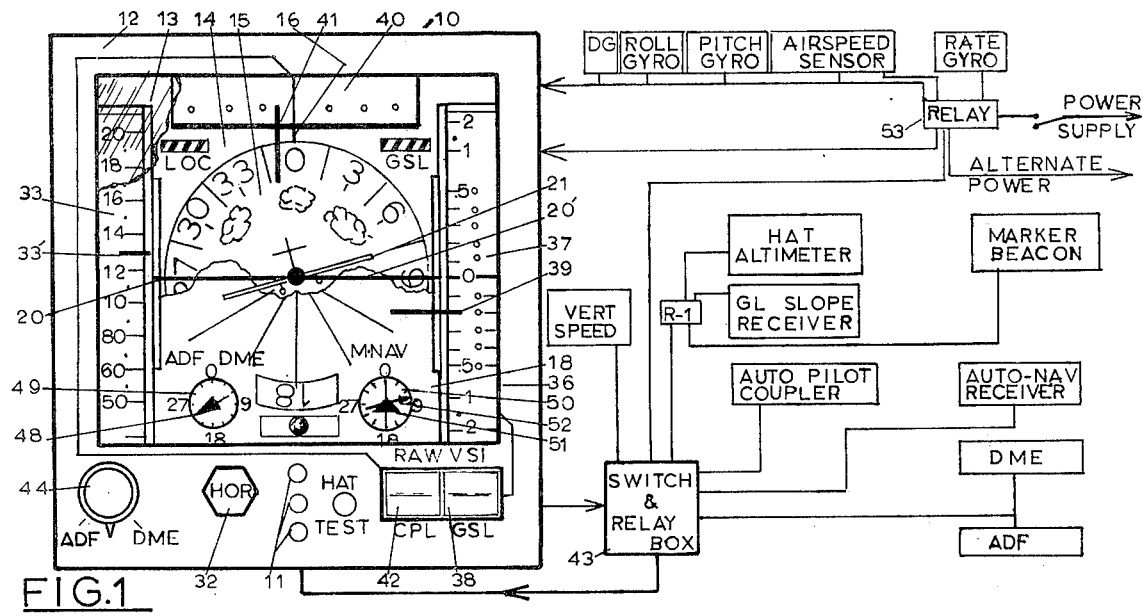
FIG.1
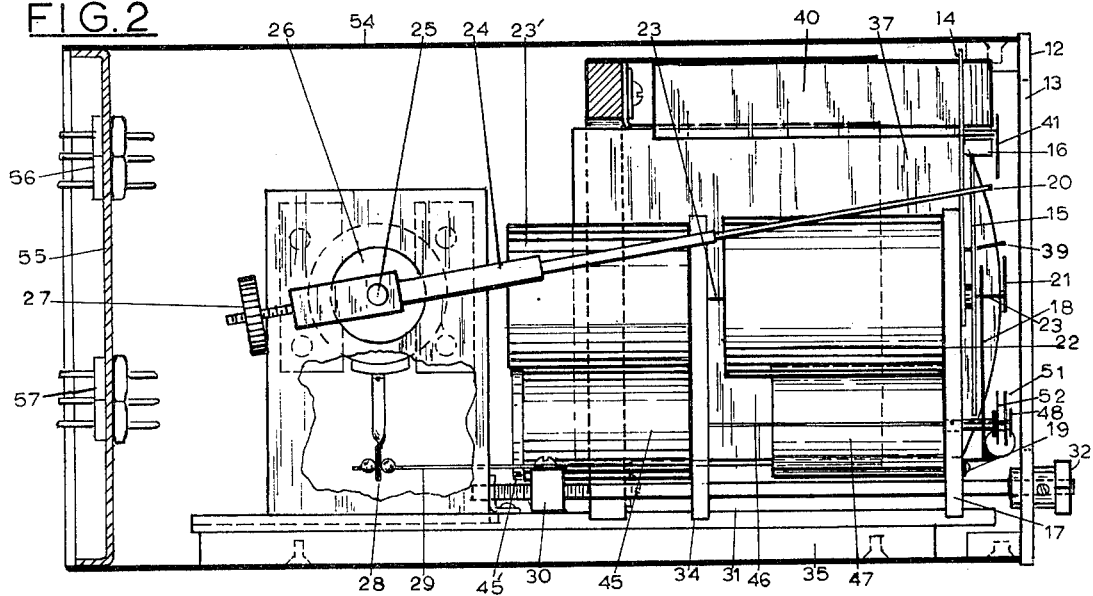
FIG.2
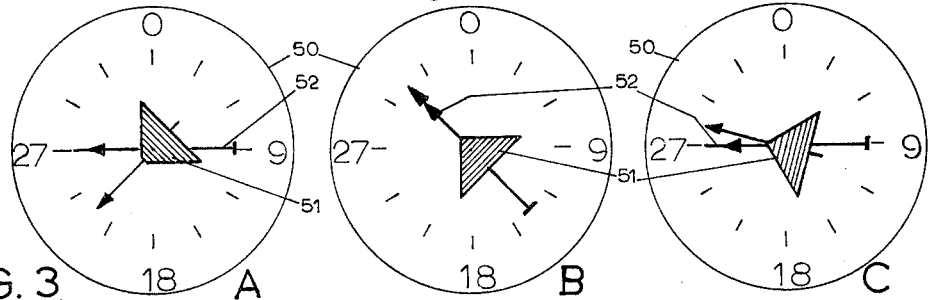
FIG.3
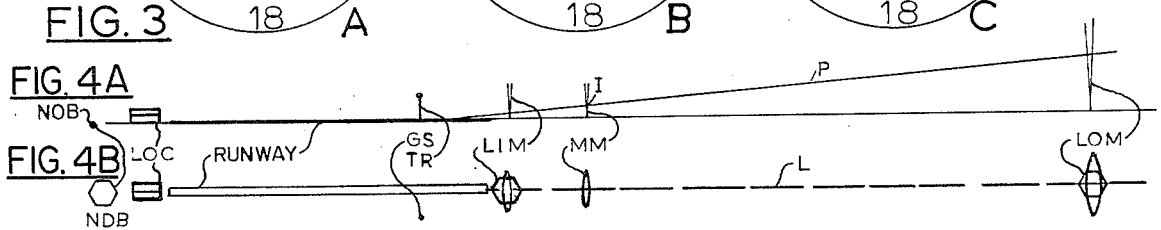
FIG.4A
FIG.4B

AIRCRAFT CONTROL/GUIDANCE DISPLAY AND MECHANISM FOR ENROUTE AND LANDING UTILITY

BACKGROUND OF THE INVENTION

1. Field of the Invention

Among the many devices provided on the aircraft instrument panel for informing the pilot as to his orientation in space, particularly while flying in obscure visibility, there are instruments described as flight directors, artificial horizons, directional gyros, and bank-and-turn indicators. All contemporary devices of this kind, individually or collectively used by the pilot in controlling and guiding his aircraft, are biologically deficient in that:

a. They fail to present a visual stimulus that is the equivalent of the "real" world environment observed by the pilot under normal visibility through the windshield.

b. The information presented in "split", requiring scanning in order to form a perception of aircraft orientation and movement in space.

c. They induce pilot vertigo and disorientation due to faulty sensing when flight is conducted in the "subjective" world of obscure visibility.

Accordingly the present invention provides a display for the pilot (during flight and landing in obscure visibility) that is an effective equivalent of the real world view through the windshield in normal visibility.

2. Description of the Prior Art

My U.S. Pat. No. 3,307,191 entitled "Aircraft Blind Landing Device and Flight Director System," dated Feb. 28, 1967 is an example of the prior art. The present invention is an improvement of marked utility over my prior invention in two fundamental ways, namely:

a. The spatial orientation of the aircraft and its movement about its axes when viewing the display is immediately perceived without eye movement. In other words the pilot's central cone of vision fixed on the aircraft and related symbols of the display requires no change to detect any movement in roll, pitch and yaw of the aircraft. In my patent noted above some eye movement is needed. It is well known now that the eye moves in jerks while reading, or while scanning instruments.

This improvement is brought about by the improved mechanism in which the roll (aircraft) symbol is superimposed over the yaw and pitch symbols in a manner that eliminates eye movements while maintaining or changing aircraft orientation in space. This feature eliminates pilot vertigo or disorientation and provides for precise control of the aircraft. With precise control maintained, the pilot can consult the associated indicia of guidance, namely the horizontal and vertical path indicators, and react to them in a highly effective manner.

b. The display element of the invention and its mechanism is disassociated from the sensors that supply all display elements. This results in a saving of space and weight on the instrument panel and enhances maintenance ease by remotely and conveniently locating the driving sensors of the invention.

SUMMARY OF THE INVENTION

In the past it has seemed proper to provide the pilot of an aircraft with indicators of many types that show angular movement of the aircraft about its three axes in degree, direction and rate without due regard to the pilot's sensory reaction to the displays.

It is believed unique in the realm of invention as disclosed in the prior art to provide aircraft control displays which recognize that the pilot of the aircraft must execute both (1) flight control while sensing the visual and other bodily cues while the real world features can be seen, and (2) flight control while unable to see real world features due to obscured visibility.

Therefore there are two "worlds" that confront the pilot seeking to control the aircraft. They are the real world of visual flight and the subjective world of the cockpit during obscure visibility outside the vehicle.

When visibility of the real world is obscured, the apparent vertical in the cockpit assumes the role of the real world vertical. The subjective horizon now is perpendicular to the apparent vertical. The eye of the pilot has no reference to the real horizon. The inner ear of the pilot begins to send erroneous signals to the brain—the disorientation of vertigo begins. No longer can the brain of the pilot determine aircraft displacement in roll, pitch and yaw. Loss of control of the aircraft is the result.

When the student pilot learns to fly and land safely, a task usually accomplished in 10–12 hours of practice, the eye, inner ear and tactile sensations provide the needed signals to the pilot's brain and reflex centers which combine to elicit corrective reaction on the aircraft controls. This learning process is refined with continuous repetition. The eye and inner ear signals work in unison in the seen real world.

Many inventions have been patented on devices that propose to provide the pilot's eye with a visual cue to enable him to override the false sensations of vertigo during flight in obscure visibility. The most successful of these include the conventionally sensed artificial horizon. An example of this art is the well-known Sperry artificial horizon and improvements thereto.

Although the artificial horizon, which reports roll and pitch displacement around the aircraft's longitudinal and lateral axes respectively, has helped the pilot to control the aircraft, with the aid of the gyroscopic direction indicator, it does in fact produce disorientation by presenting a roll cue that "appears" to tilt the horizon reference rather than the aircraft symbol. This results from the pilot's biological reaction to the "subjective" world of the cockpit in the absence of external (to the aircraft) visibility. This abberation was unexpected, and the design has remained essentially unchanged as does the effect produced.

The artificial horizon reports two of the three motions of the aircraft. The pilot must look away to the directional gyro reading in order to complete an understanding of the motion of the aircraft about its three axes—all in the presence of some vertigo.

The present invention is unique in that it displays all motion of the aircraft about its three axes (limited in amount to some extent) in a manner biologically satisfying to the pilot, thus eliminating vertigo. This is done by making the aircraft symbol roll in relation to the horizon bar, which latter moves above and below the aircraft symbol as the aircraft pitches, while at the same time the pilot sees movement in yaw displayed by the properly sensed heading card behind the aircraft symbol. Accordingly the relative movement of the real world as seen by the pilot in good visibility is reproduced and sensed in a manner that is effective in providing, in the subjective world of the cockpit, the equivalent visual cues of normal clear visibility flight.

The pilot may need to direct his attention away from the subject display to navigation (guidance) features. When again he looks at the control features of the display he is instantly appraised of proper aircraft orientation, without the need to scan several separate instruments. This scanning procedure not only requires time to synthesize the separate indications into a single mental picture but allows vertigo to develop due to (1) head and eye movements and (2) wrong sensing of individual instruments. By far the greatest offender that produces vertigo is the wrongly sensed display of roll/yaw.

In this invention the parameters of flight that have a bearing on manual control of the airplane are vertical speed and airspeed. The values of these parameters are displayed closely adjacent to the visual display of roll, pitch and yaw. No head movement is required to read the displayed values, which in itself causes vertigo. In like manner guidance indices of radio navigation, as well as power plant performance (rpm, percent power, or manifold pressure) are placed within the central vision of the pilot for ease of evaluation.

The use of remote control technology makes it possible to achieve, in the present invention, a blending of sensory stimuli of aircraft roll, pitch and yaw that the pilot has used from the beginning of his learning process, to control and guide the aircraft free of disorienting vertigo.

The turning motion of the aircraft in the present invention as displayed by the upper portion of the rotating card produces a meaningful eye stimulus to reduce vertigo as well as to show both rate and degree of turn to match a given angle of bank or change thereof.

DESCRIPTION OF THE DRAWINGS

FIG. 1 depicts the front elevation of the display together with a diagrammatic presentation of the devices that serve to originate the output of electrical signals which when received in the display unit produce the visual sensory stimuli needed by the pilot in controlling and guiding the aircraft.

FIG. 2 is a cutaway showing of the display unit which indicates the relationship of the electric meters and synchro motors which respond to the sensors of control and guidance.

FIG. 3 shows three situations of aircraft guidance in relation to the VOR (visual omni-range) received signals, courses and direction to the station with reference to the aircraft heading.

FIGS. 4A and 4B show the vertical elevation and horizontal diagrammatic views respectively of the ILS instrument landing system of the invention with reference to the ground-based features there of, and to the related equipment of the invention.

DESCRIPTION OF THE PREFERRED EMBODIMENTS

Reference is made to FIG. 1 which shows the essential details of the control/guidance display unit 10. The all important element of the unit, the general shape of which is shown in both FIG. 1 and FIG. 2, is the composite display which is contained within the frame structure 12 behind the transparent cover plate 13.

The composite display that elicits human response to the control of the aircraft consists of a background dial 14 of FIG. 1 and FIG. 2. This background dial is stationary and extends downwardly just below the center of the display as shown in FIG. 2. It is provided with cutouts to permit viewing of related dials of cooperating instruments. The color of the dial 14 is preferably the same as the color of the rotatable dial 15 which reports the aircraft heading and heading changes as noted at the lubbers line 16 (FIG. 1 and FIG. 2). The dial 14 is fixed, by suitable screws (not shown) to the front pedestal 17. The lower edge of the dial 14 extends slightly below the centerline of the display.

Another fixed dial 18 of contrasting color extends upwardly, being fastened to the pedestal 17 by screws one of which is shown at 19 (FIG. 2). The upper edge of the dial 18 may be formed as shown in FIG. 1 to represent a distant mountain silhouette.

The dial 15 forms a backdrop for the two other essential moving elements, namely (1) the horizon bar 20 and 20', and (2) the roll symbol 21. The juxtaposition of the three elements (dial 15, horizon bar 20 and 20', and roll symbol 21) and their relative movement (of the three indices to report roll, pitch and yaw) constitute the basis and essential elements of visual information needed by the pilot in the spatial control of his craft. This is the visual equivalent of what the student pilot sees in learning to fly.

The rotating dial 15 is affixed to the shaft of the synchro 22. The roll symbol 21 is affixed to the shaft 23 of the synchro 23' (FIG. 2). The shaft 23 extends through the hollow shaft of the synchro 22.

The horizon bar 20 is supported by the arm 24 which is affixed to one end of the shaft 25 of the synchro 26. The weight 27 maintains the balance of the system. The horizon bar 20 extends almost half way across the face of the dial, its tip just clearing the shaft 23 of the synchro 22. In like manner the horizon bar 20' and its attached arm (FIG. 1) is affixed to the other end of the shaft 25 of the synchro 26.

An arm 28 is cemented to the synchro 26 and in turn engages a push-rod 29 which is fastened to the threaded member 30. This member engages the screw rod 31 which extends to the front of the device and is there fitted with a knob 32 by means of which the synchro 26 may be rotated in order to modify the position of the horizon bar 20 and 20'.

The synchros 22 and 23' are supported in conventional clamped manner to the pedestals 17 and 34 respectively. Each pedestal is fastened into slots in the base 35 of the device.

The structure just described constitutes the needed elements to provide the essential indicia for portrayal of the related spatial movements of the aircraft. Each of the three synchro receivers just described is electrically connected to the synchro transmitter affixed to each of the corresponding gyros that report roll, pitch and yaw of the aircraft and which are shown in diagrammatic form in FIG. 1.

Sensors for reporting the vertical speed and airspeed of the aircraft are shown in diagram in FIG. 1 and transmit airspeed information to the microammeter 33 and its pointer 33', and vertical speed to the microammeter 36. The closely associated indications of airspeed and vertical speed to the indications of spatial orientation provide the pilot with effective vertigo free evaluation of flight control parameters. The marker beacon receiver activates the marker lamp cluster 11.

The microammeter 36 additionally provides the pilot with vertical navigation information in the form of glide slope locus since the scale 37 delineates both numerals for vertical speed and "dots" for glide slope information as is readily understood in the art. A selector switch 38 permits the pilot to choose the desired reading.

The pilot having selected the glide slope information in the process of an approach to landing on the ILS system (FIGS. 4A and 4B) will also be provided with height above touchdown (HAT) information after the aircraft passes either the middle (MM) or inner (LIM) marker of the ILS. Both FIGS. 4A and 4B show in the diagrammatic form the commonly associated localizer (LOC) and glide slope transmitters (GSTR). FIG. 4A is the vertical elevation of the system and shows the glide path P, which the aircraft will follow to touchdown as it passes over the outer marker (LOM), the middle marker (MM) and in some installations the inner marker (LIM) before reaching touchdown on the runway prior to passing the glide slope transmitter (GSTR).

FIG. 4B shows a symbolic plan view of the landing system with the localizer path L representing the "on course" locus provided by the localizer transmitter (LOC). It will be noted in the scale 37 of FIG. 1 that the lower five dots of the glide slope scale have adjoining horizontal bars. Each bar represents a ten foot increment of aircraft approach to touchdown from a HAT of fifty feet.

Assume that the middle marker (MM) is the selected marker beacon that will automatically activate the HAT landing altimeter, which is described in my U.S. Pat. No. 3,797,308, dated Mar. 19, 1974 entitled "Aircraft Landing Altimeter."

When the aircraft in the landing approach reaches the middle marker energy pattern the relay R-1 (FIG. 1) switches the meter 36 away from the glide slope receiver to the HAT altimeter. immediately the pointer 39 of the meter 36 drops to the lowest horizontal bar (right side) of the meter scale 37. This indicates that the aircraft is 200 feet above touchdown, or some deviation from this value. As the aircraft descends the meter pointer reaches the next horizontal bar to indicate the aircraft height of 100 feet above touchdown. Then when the pointer reaches the next horizontal bar the pointer will count down each 10 feet from 50 feet to touchdown. This triple use of the meter 36 and its scale 37 is not only a spatial economy but likewise is effective in reducing disorientation and vertigo which result from head movements during obscure visibility flight. Only one scalar reading is needed for a given portion of the approach/landing.

The AUTO/NAV receiver selectively provides information to the microammeter 40 the pointer 41 of which will indicate deviation from the omni beacon course or the localizer course. The selector switch 42 will permit, by means of the relay box 43 the indication of raw data from the AUTO/NAV receiver (localizer frequency), or computed (coupled) data from the autopilot coupler circuitry to provide command bar steering for the pilot. If the aircraft is equipped with an automatic direction finder (ADF) and distance measuring equipment (DME) either may be selected by use of the switch 44. Each must be provided with conventional synchro (transmitter) output in order to drive the synchro receiver 45 the shaft 46 of which (FIG. 2) extends past the tandem front dual synchro 47 (located on the opposite side of the device) to drive the pointer 48 of the dial 49 (FIG. 1).

A dial 50 (FIG. 1 and FIG. 2) with associated pointers 51 and 52 presents information usually found in a conventional "horizontal situation indicator (HSI)". This multi-nav (M-NAV) indicator is far simpler than the HSI and less costly. It requires no special "converter" and consists of a simple tandem synchro receiver. The front synchro receiver is made responsive to the rotation of the course dial shaft of an automatic centering nav receiver synchro transmitter shown diagrammatically in FIG. 1, and best exemplified in practice by the EDO-AIRE Nav receiver or similar type. The pointer 52 is affixed to the synchro 47. This pointer has a double end. The arrowhead end always points to the course "TO" the VOR station during operation while the tail of the pointer points to the value of the radial "FROM" the VOR station. Accordingly the whole pointer defines a "course line." The pointer 51 is affixed to the rear synchro 45' with its shaft driving through the hollow shaft of synchro 47. This pointer rotates responsive to the synchro transmitter of a directional gyro which may or may not be magnetically slaved. Neither the dial 49 nor the dial 50 rotate.

In FIG. 3 three representative readings of the multi-nav (M-NAV) dial are shown.

In FIG. 3A the reading indicates that the aircraft is heading 225 degrees. The course to the VOR is 270 degrees. The aircraft is presently on the 090 degree radial and the intercept angle (heading to course) is 45 degrees.

In FIG. 3B the aircraft is heading 315 degrees on a course of 315 degrees to the VOR, and is on the 135 degree radial.

In FIG. 3C the aircraft is heading 285 degrees on a course of 270 degrees to the VOR, presently on the 090 degree radial.

It should be obvious that the radio receivers and other devices are powered by an on-board source of electric current, both direct current and alternating current, as is well understood in the art. An alternate source of direct current may be provided as shown in FIG. 1 in the event of main source failure in which case the relay 53, FIG. 1, would activate the alternate source.

The mechanism of the device supported on its base 35 is provided with a case 54 of rectangular cross-section with the rear end closed by the cover 55 which is fitted with multiple pin plugs 56 and 57, (FIG. 2), to accommodate the direct current circuits that serve the meters and the alternating current circuitry that serves the synchros.

Deleted from the drawings are the wires, terminals and switches which would tend to confuse the important details of the invention and all of which are well understood in the art.

It should now be obvious that the subject invention includes a display for control and guidance of an aircraft which embodies only recently understood biological factors that have a vital import on human pilot performance relating to spatial disorientation.

It can be seen that all contemporary ground based electronic navigation aids are effectively employed to supply instant information of aircraft path and position in a display that is integrated with the display for spatial orientation within the confines of an area which eliminates pilot head movements and reduces to a minimum pilot eye movements thereby enhancing flight safety and operational effectiveness.

To examine the control features only:

Consider a distraction that requires the pilot's attention to be diverted from the display. As soon as he regains visual contact with the display the complete composite visual cue for control is present as he views the aircraft symbol. FIG. 1 would indicate a slow level turn to the left just passing a heading of 360 degrees. Although the adjacent airspeed and vertical speed readings are immediately available they are of less urgency as the pilot resumes spatial control of the aircraft. Acrobatic maneuvers may be accomplished within the limits of the particular gyros selected as sensors.

To examine the navigation features only:

As noted above either the ADF function or the distance reading of DME installation may be switched to the dial 49. The distance range reading may be selected at the DME unit for either 0–360 miles or 0–36 miles on the dial 49.

The multi-nav (M-NAV) dial 50 function has been explained above but its use as an HSI instrument also provides the additional advantage of a conventional RMI (radio magnetic indicator) instrument when used with the closely associated dial 49 when the latter is switched to the ADF receiver at which time the bearing TO both a non-directional beacon (NDB) and VOR can be observed without the confusion of the contemporary RMI with its two moving pointers and associated moving dial.

The advantages of having the normalized complete control picture integrated with the navigational features are manifestly apparent during the approach/landing maneuver. To explain, refer to FIGS. 4A and 4B and note the close proximity of the ADF and DME dial to the roll, pitch and yaw composite display making capture of the (LOM) outer marker fix quite easy. Arriving at the outer marker the vertical speed is deleted in favor of the very open glide slope scale pointer 39 and the localizer pointer 41 are well within the central vision of the pilot which includes the vital control presentation.

As the aircraft follows the glide path P as shown in FIG. 4A it reaches the (MM) middle marker at which intersection I the glide slope receiver is automatically switched OFF as the HAT landing altimeter (as described in my patent noted above) is switched ON. At the instant the glide slope pointer 39 drops to its full down scale position, as described above, to begin rising to the zero position at touchdown just opposite the right wing of the aircraft symbol.

As the aircraft approaches within a few feet of touchdown, easily noted in the composite display, the pilot flares the aircraft and cancels crab. At that instant the pilot may concentrate on observing the pointer of dial 49 and keeps its arrow or tail pointer to zero for "roll out" with the aircraft heading to the NDB or its reciprocal to keep the aircraft from rolling off the runway.

What I claim is:

1. In an aircraft control and guidance system, an avionics display structure including a base having a plurality of synchro receivers mounted thereon, one synchro receiver including a rotatable shaft having a transverse axis of rotation, arm means affixed to each end of said rotatable shaft, said arm means having inwardly bent horizontal portions providing a substantially continuous horizon bar for up and down movement parallel to said base for indicating pitch with reference to a horizontally disposed lubbers line, a tandem pair of synchro receivers, each having a shaft, the shaft of one said tandem pair of synchro receivers passing through the shaft of the other along a common longitudinal axis, an aircraft symbol pointer mounted on the shaft of one said tandem pair of synchro receivers for portraying aircraft roll to the right by clockwise rotation thereof and aircraft roll to the left on counterclockwise rotation thereof, the shaft of the other of said tandem pair of synchro receivers having affixed thereto a circular dial for clockwise rotation in response to left aircraft turns and counterclockwise rotation in response to right aircraft turns, said circular dial having delineated thereon a compass rose for indication of aircraft heading and an associated lubbers line;

an upstanding fixed partial dial interposed between said circular dial and said horizon bar for partially obscuring the substantive lower portion of said circular dial;

a first microammeter, scale and pointer and comprising a course direction indicator; and a second microammeter, vertical scale, and vertically moving pointer and comprising means for selective indication of glide slope, vertical speed and height above touchdown;

a first vertical gyro having synchro output for driving said one synchro receiver;

a second vertical gyro having synchro output for driving said one of said tandem pair of synchro receivers having said aircraft symbol pointer mounted on the shaft thereof;

a directional gyro having synchro output for driving said one of said tandem synchro receivers having said circular dial mounted on the shaft thereof;

a VOR/LAC navigation receiver having output for operating said course direction indicator;

a glide slope receiver having output for operation of second microammeter in indicating glide slope;

a vertical speed sensor having output for operation of said second microammeter in indicating vertical speed;

a height-above-touchdown landing altimeter having output for operation of said second microammeter in indicating height above touchdown;

switch means for selective operation of said second microammeter by said glide slope receiver and vertical speed sensor;

said avionics display structure being contained with a case for viewing thereof; and said case having electric connector plug means for operative transmission of output to said avionics display structure.

2. An aircraft control and guidance system as specified in claim 1 wherein said avionics display structure includes a third microammeter, scale and pointer and comprising an air speed indicator;

an air speed sensor having output for operating said air speed indicator;

said first and second vertical gyro, directional gyro, VOR/LAC navigation receiver, glide slope receiver, vertical speed sensor, height-above-touchdown landing altimeter, and air speed sensor being remote from said avionics display structure, each having a synchro transmitter for providing the output thereof;

a normally closed double throw multipole relay, the output of said synchro transmitter of each said glide slope receiver, and height-above-touchdown landing altimeter being operable through said multipole relay for transmission of the output thereof to said second microammeter;

a remote marker beacon receiver, responsive to a ground based marker beacon transmitter, said marker beacon receiver having a frequency channel operative by a matching frequency of a ground based marker beacon transmitter for actuation of said multipole relay for selective operation of said second microammeter, by interrupting output of said glide slope receiver thereto and locking in output of height-above-touchdown landing altimeter to said second microammeter; and relay means for interconnecting said aircraft control and guidance system to an alternate source of power in the event of failure of the main aircraft power source.

3. An aircraft control and guidance system as specified in claim 1 wherein said avionics display structure includes a dual pointer guidance display positioned over said fixed partial dial, said dual pointer guidance display including a substantially delta-shaped pointer and a double-ended pointer;

a second tandem pair of synchro receivers each having a shaft, the shaft of one said second tandem pair of synchro receivers passing through the shaft of the other along a common longitudinal axis, said delta-shaped pointer being mounted on the shaft of one said second tandem pair of synchro receivers, and said double-ended pointer being mounted on the shaft of the other of said second tandem pair of synchro receivers, said one said second tandem pair of synchro receivers being responsive to the output of said directional gyro and rotating in unison and degree with said circular dial whereby said substantially delta-shaped pointer indicates aircraft heading; and an automatic centering NAV receiver having output for operation of said other of said second tandem pair of synchro receivers whereby one end of said double-ended pointer indicates aircraft position on a given VOR radial and the other end thereof indicates course to a VOR transmitter.

4. An aircraft control and guidance system as specified in either of claims 1 including a marker beacon receiver actuable by a ground based beacon transmitter, and means operatively interconnected to said marker beacon receiver for selective operation of said second microammeter, by interrupting output of said glide slope receiver to said second microammeter and locking in output of said height-above-touchdown landing altimeter to said second microammeter.

* * * * *